(12) United States Patent
DeWalt

(10) Patent No.: US 10,596,959 B1
(45) Date of Patent: Mar. 24, 2020

(54) SYSTEM AND METHOD FOR SIGNALING VEHICLE SPEED AND RAPID DECELERATION UTILIZING TAIL LIGHTS

(71) Applicant: Douglas Gary DeWalt, Ottawa Hills, OH (US)

(72) Inventor: Douglas Gary DeWalt, Ottawa Hills, OH (US)

( * ) Notice: Subject to any disclaimer, the term of this patent is extended or adjusted under 35 U.S.C. 154(b) by 0 days.

(21) Appl. No.: 16/151,472

(22) Filed: Oct. 4, 2018

(51) Int. Cl.
| | |
|---|---|
| B60Q 1/54 | (2006.01) |
| B60Q 1/44 | (2006.01) |
| B60Q 1/46 | (2006.01) |
| B62J 6/00 | (2020.01) |
| H05B 45/10 | (2020.01) |
| B60Q 1/08 | (2006.01) |
| B62J 6/015 | (2020.01) |

(52) U.S. Cl.
CPC .............. *B60Q 1/54* (2013.01); *B60Q 1/444* (2013.01); *B60Q 1/46* (2013.01); *B62J 6/015* (2020.02); *H05B 45/10* (2020.01); *B60Q 1/085* (2013.01); *B60Q 2300/112* (2013.01); *B60Q 2900/10* (2013.01)

(58) Field of Classification Search
None
See application file for complete search history.

(56) References Cited

U.S. PATENT DOCUMENTS

| | | | |
|---|---|---|---|
| 4,019,171 A | 4/1977 | Martelet | |
| 4,346,365 A | 8/1982 | Ingram | |
| 5,416,702 A * | 5/1995 | Kitagawa | B60L 1/003 701/36 |
| 5,941,922 A * | 8/1999 | Price | F16H 63/42 340/439 |
| 6,509,832 B1 * | 1/2003 | Bauer | B60Q 1/0023 340/425.5 |
| 7,121,676 B1 * | 10/2006 | Kutnyak | A42B 3/044 362/105 |
| 7,150,554 B2 * | 12/2006 | Calderas | F21S 43/255 362/545 |
| 7,433,772 B2 | 10/2008 | Isaji et al. | |
| 7,541,918 B1 | 6/2009 | Rizzi | |
| 7,932,820 B2 * | 4/2011 | Hurwitz | A42B 3/0453 340/432 |
| 8,981,952 B2 * | 3/2015 | Howard | A42B 3/046 2/10 |
| 9,534,756 B2 * | 1/2017 | Takahira | F21V 14/00 |
| 9,603,403 B2 * | 3/2017 | Boutte | B60Q 1/2676 |
| 10,315,559 B2 * | 6/2019 | Hammock | B62J 6/04 |
| 2003/0122930 A1 * | 7/2003 | Schofield | B60R 1/00 348/148 |
| 2005/0134483 A1 * | 6/2005 | Monji | B60Q 1/085 340/933 |
| 2006/0133103 A1 * | 6/2006 | Muhlbaier | B60Q 1/2607 362/545 |

(Continued)

*Primary Examiner* — Fekadeselassie Girma

(74) *Attorney, Agent, or Firm* — Fay Sharpe LLP

(57) ABSTRACT

A system is disclosed for sequentially illuminating segments of vehicle LED arrays of tail lights, when running lights are "on", in response to incremental changes in vehicle speed. In response to rapid vehicle deceleration above a predetermined threshold, the system cyclically moves a darkened segment across an illuminated array of LED brake lights with or without the operator applying the brakes.

15 Claims, 6 Drawing Sheets

(56) References Cited

U.S. PATENT DOCUMENTS

| | | | | |
|---|---|---|---|---|
| 2007/0008095 A1* | 1/2007 | Gwinn | B60Q 1/444 | |
| | | | 340/476 | |
| 2007/0146813 A1* | 6/2007 | Sakamoto | H04N 1/484 | |
| | | | 358/461 | |
| 2008/0316759 A1* | 12/2008 | Valcamp | B60Q 1/0011 | |
| | | | 362/507 | |
| 2009/0021365 A1* | 1/2009 | Hurwitz | A42B 3/0453 | |
| | | | 340/479 | |
| 2009/0190369 A1* | 7/2009 | Elwell | B60Q 1/2607 | |
| | | | 362/541 | |
| 2010/0308985 A1* | 12/2010 | Pusch | B60Q 1/525 | |
| | | | 340/435 | |
| 2012/0001747 A1* | 1/2012 | Klatt | F16H 59/12 | |
| | | | 340/456 | |
| 2013/0258488 A1* | 10/2013 | Hatakeyama | B60K 35/00 | |
| | | | 359/630 | |
| 2014/0180538 A1* | 6/2014 | Mineo | B60W 50/14 | |
| | | | 701/36 | |
| 2015/0137965 A1* | 5/2015 | Lanham | B60Q 1/2607 | |
| | | | 340/479 | |
| 2016/0014206 A1* | 1/2016 | Isobe | H04L 67/12 | |
| | | | 455/557 | |
| 2017/0050556 A1* | 2/2017 | Nakashima | B60Q 1/085 | |
| 2018/0045387 A1* | 2/2018 | Roach | B60Q 1/2607 | |
| 2019/0039578 A1* | 2/2019 | Sanchez | B60T 8/1708 | |
| 2019/0143888 A1* | 5/2019 | Schaye | B60Q 1/447 | |
| | | | 315/79 | |
| 2019/0217769 A1* | 7/2019 | Nekic | B60Q 1/448 | |
| 2019/0234601 A1* | 8/2019 | Wescott | F21V 23/0407 | |
| 2019/0255955 A1* | 8/2019 | Higaki | H01M 2/1077 | |
| 2019/0315169 A1* | 10/2019 | Rogness | B60D 1/62 | |
| 2019/0315271 A1* | 10/2019 | Tatara | B60Q 1/54 | |

\* cited by examiner

SYSTEM AND METHOD FOR SIGNALING VEHICLE SPEED AND RAPID DECELERATION UTILIZING TAIL LIGHTS

BACKGROUND

The present disclosure relates to vehicles having tail lights illuminated for nighttime and reduced visibility driving and illuminated upon application of the vehicle brakes by the operator. Currently, motor vehicles employing engines driving the wheels through an automatic transmission decelerate only moderately upon release of the engine throttle and thus require the operator to apply the brakes often in traffic; and, upon application of the brakes, the tail lights are illuminated brightly to provide a readily visible indication to the operator of a trailing vehicle that the lead vehicle is decelerating.

It has recently become desirable to propel vehicles with electric motors operating from storage batteries to reduce harmful engine exhaust emissions. However, electric motor driven vehicles, upon the operator releasing the accelerator or drive pedal and discontinuing the current to the electric drive motor from the battery, impart the kinetic energy of the moving vehicle to drive the propelling motors as generators; and, the counter electromotive force (EMF) so produced in the motors applies a retarding force to the vehicle wheel drive and thus provides deceleration to the vehicle. This deceleration due to the counter EMF can produce a rapid rate of deceleration which would typically be experienced only by the vehicle operator applying the brakes. Thus, an electrically driven vehicle can experience rapid deceleration without the operator application of the brakes without activating the brake lights on the rear of the vehicle. This occurrence would fail to signal the human operator of a trailing vehicle that the lead vehicle was rapidly decelerating and thus can produce a hazardous situation and increase the likelihood of a vehicle collision.

The current desirability of increasing the number of electrically driven vehicles on public roads and decreasing the use of fossil fuel burning internal combustion engines for environmental reasons and the increased use of electric vehicles has thus created a need to provide an indication to the operator of a trailing vehicle that the electrically driven lead vehicle is decelerating and particularly without the operator of the lead vehicle applying the brakes as well as when the operator has applied the brakes. In this regard, it has become desirable to provide a means of utilizing the vehicle tail lights to indicate that the vehicle is rapidly decelerating, even when the vehicle operator is not applying the brakes.

SUMMARY

The present disclosure provides a solution to the above-described problem of indicating to a human operator of a following or trailing vehicle the rapid deceleration of an electrically driven leading vehicle which occurs when the driving current is cut off to the electric drive motors. The system of the present disclosure provides moving dark bands on the illuminated tail lights at any time the vehicle decelerates at a rate greater than a predetermined rate. The disclosed system also utilizes cumulative sequential illumination of the tail lights in response to incremental changes in the vehicle speed when the vehicle is operating with running lights "on".

The system and method of the present disclosure provide a vehicle speed sensor providing an electrical signal indicative of the instantaneous vehicle road speed; and, the signal from the speed sensor may be in the form of a pulse width modulated voltage. The signal from the speed sensor is provided to an electronic controller which provides an output control signal, with running lights "on", which changes to sequentially illuminate segments of the tail lights only when the vehicle road speed changes in predetermined increments.

The output control signal at the controller may reset to sample the output of speed sensor at a rate in the range 24-30 Hz and supplies a control signal to the tail lights which comprise an array of discrete illuminators, such as LEDs, arranged in an array of clusters or spaced rows which may be linear or curved. When the running lights are on, the rows of discrete illuminators are illuminated cumulatively by the electronic controller and change, according to the incremental change in vehicle road speed, in a manner in which the number of discrete illuminators illuminated increases as the vehicle speed decreases; and, the controller sequentially decreases the accumulated number illuminated incrementally as the vehicle speed increases. The operator of a trailing vehicle sees the number of LEDs or rows illuminated maintained constant as long as the vehicle speed remains within a predetermined increment. The rate at which the number of discrete illuminators or rows illuminated changes is thus readily perceived visually by the human operator of a following or trailing vehicle so as to enable an appropriate response. The vehicle LEDs may be arranged in spaced segments such as clusters, in a line, or in spaced rows.

In one version, the discrete illuminators such as LEDs may be arranged in a single row, such as a substantially linear vertical column, wherein the number of such LEDs is cumulatively increased or decreased as the increment of sensed vehicle speed changes. In another version, the LEDs are arranged in spaced, substantially parallel horizontal rows spaced vertically wherein the number of rows illuminated is cumulatively increased or decreased as the increment of sensed vehicle speed changes. In other versions described herein, the array of such rows are of various geometric configurations namely: curved, nested triangular, nested closed plane curves and nested polygons.

The controller is operative, upon operator application of the vehicle brakes, to initially illuminate all of the tail light LEDs. Upon the controller at any time sensing a negative time rate of change in the road speed signal ($-dV_R/dt$) above a predetermined threshold, with or without brakes being applied, the controller is operative to create a dark band across a discrete segment on the illuminated tail light array and to move cyclically the dark banded segment incrementally over the entire array, at a predetermined cyclic frequency, to alert the operator of a trailing vehicle of rapid deceleration of the lead vehicle. In one version, the dark band is provided in the center of the array and then divided and moved sequentially in opposite directions over adjacent discrete segments of LEDs to the margins of the array. Thus, the system of the present disclosure is operable to provide a signal, utilizing the tail lights, to a trailing vehicle of a high rate of deceleration of a leading vehicle with and without operator application of the vehicle brakes.

DETAILED DESCRIPTION

Figure 1:
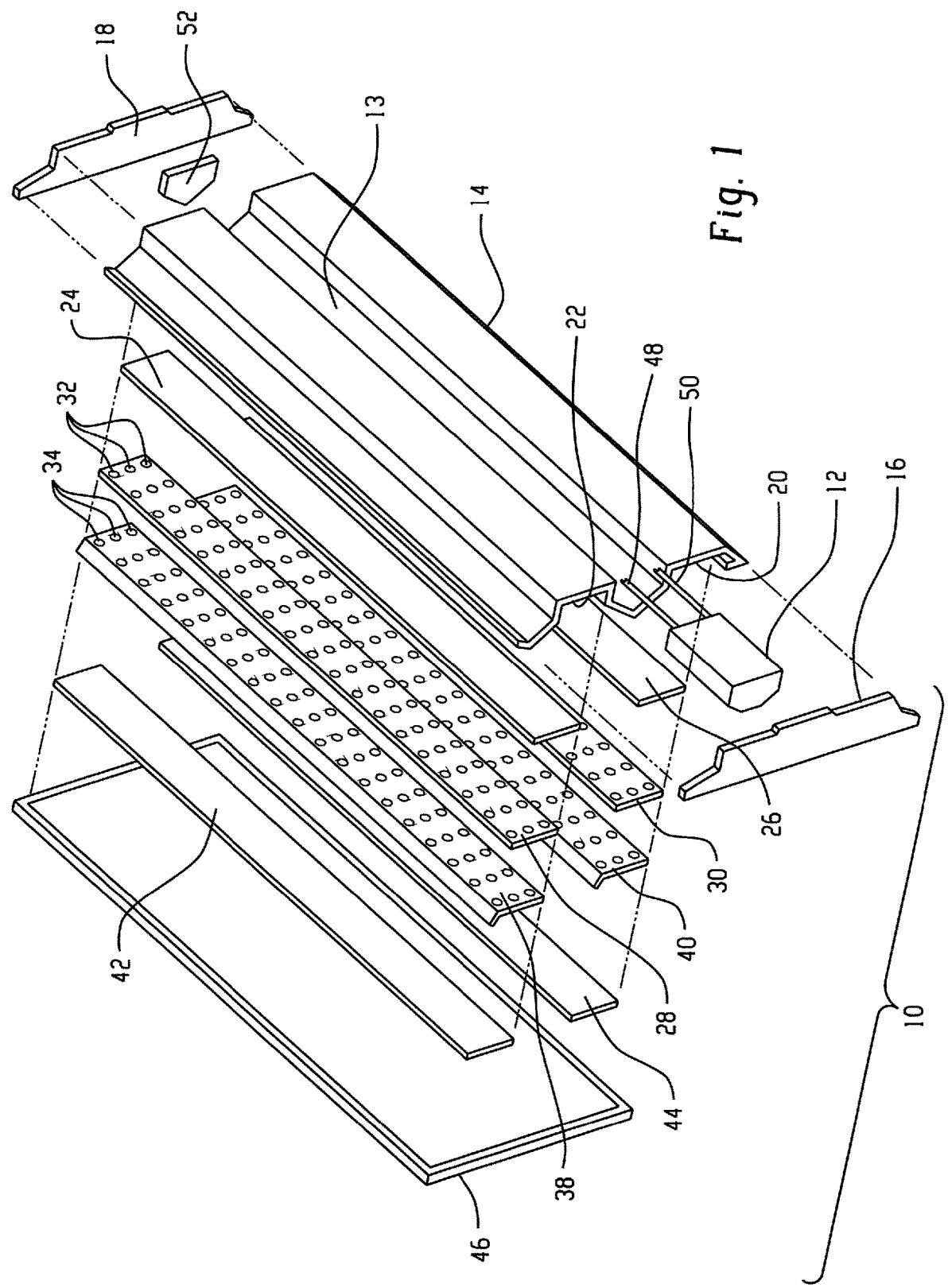
FIG. 1 is an exploded perspective view of a rectangular tail light assembly having a vertically oriented array of LEDs.

Referring to FIG. 1, a tail light assembly in accordance with the present disclosure is indicated generally at 10 and has a substrate or bracket 14 for mounting and which has a partial reflective surface which may be a chrome plated surface on the inside and which also serves as a heat sink. An electronic control unit (ECU) or controller 12 is conveniently mounted in a channel 13 on the bracket 14. In the present practice, it has been found satisfactory for the ECU to reset and sample the vehicle road speed in the range 24-30 Hz. The bracket 14 has end plates 16, 18 for enclosing the illuminators as will hereinafter be described. The bracket 14 is configured to have a pair of spaced parallel channels 20, 22 formed on the reflecting side, each of which has respectively received therein a reflector 24, 26 which is formed of electrically conductive heat resistant material having a chrome plated surface for reflecting light.

Elongated strips 28, 30 having an array of LEDs thereon are received over the surfaces of the reflectors 24, 26, respectively. In the version shown in FIG. 1, each of the strips with LED arrays 28, 30 has three rows of LEDs, denoted 32, with each row having 19 LEDs spaced therealong. In the present practice, it has been found satisfactory to have at least 17 LEDs in each row; however, the number of LEDs employed may be varied in accordance with the desired amount of illumination for the tail light.

Each of the strips of LED arrays 28, 30 has received thereover respectively a reflector insert 38, 40, respectively, having apertures 34 provided therein for each of the LEDs to extend therein. If desired, the reflector may have a chrome plated surface and may be formed to a parabolic curvature in cross-section to focus the illumination from the LEDs. Each of the reflectors 38, 40 has an optical lens, denoted respectively 42, 44, disposed thereover; and, each of the lenses 42, 44 may include a diffuser and may be colored if desired. An outer covering lens 46 is disposed over the optical lenses 42, 44 and lens 46 is attached to the margins of the bracket 14 and end plates 16, 18 to provide a closure for the assembly. The ECU 12 has wires (not shown) connected therefrom to each of the LED arrays 28, 30 for providing power thereto for illumination. The ECU 12 has wires 48, 50 connected thereto which extend along the channel 13 outwardly from the distal end of the channel for connection to an on-board power supply and road speed sensor. The ECU 12 also has conductors or wires (not shown) connected therefrom to LED strips 28, 30 for providing an illuminating control signal thereto. As shown in FIG. 1, a rubber seal plug 52 is provided to seal the channel 13. The version of FIG. 1 has the LEDs arranged in horizontally extending rows spaced vertically; however, alternatively the LEDs may be arranged in discrete segments of clusters or rows having various geometric configurations such as linear, curved, nested triangular, nested closed plane curves, and nested polygons.

Figure 2:
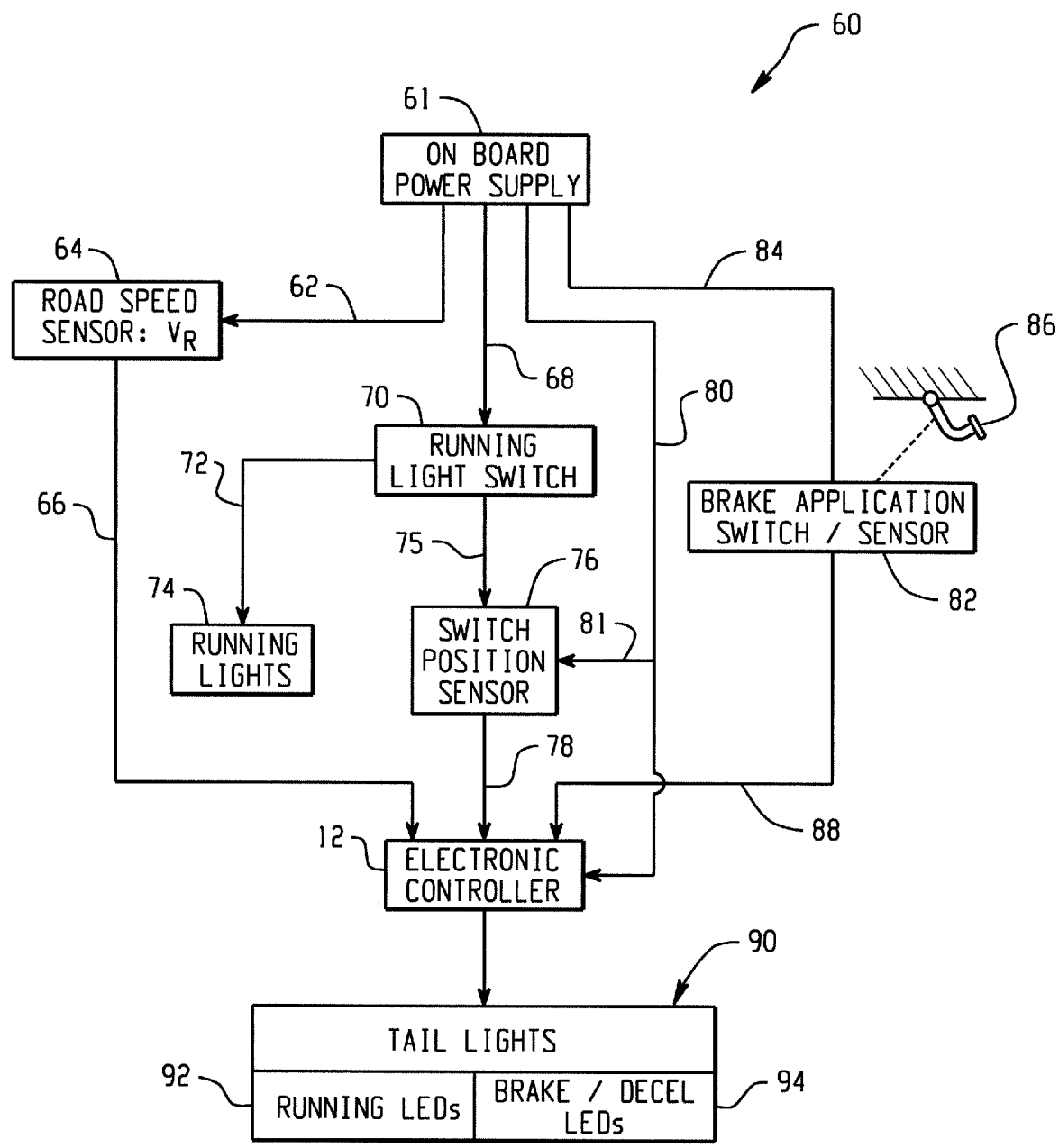
FIG. 2 is a block diagram of the electrical connections of the system of the present disclosure.

Referring to FIG. 2, the system show diagrammatically and denoted generally at 60, includes a vehicle onboard power supply 61, typically 12 volt DC, connected to apply power along line 62 to a road speed sensor 64 for providing a road speed signal $V_R$, which may be a pulse width modulated signal, and which provides the signal $V_R$ along line 66 to an input of the ECU 12. The power supply 61 also provides power along line 68 to a running light switch 70 which provides power along line 72 to the vehicle running lights indicated generally at 74. A switch position sensor 76 is also connected to the running light switch 70 along line 75; and, the switch position sensor 76 provides a switch position signal along line 78 to the ECU 12. The switch position sensor 76 is powered along line 80 and 81 from the onboard power supply 61; and, the electronic controller 12 is also connected to power supply 61 along line 80. A brake application switch/sensor 82 receives power from the power supply 61 along line 84 and is operatively connected to the vehicle operator brake applicator 86 as indicated by dashed line 87 in FIG. 2. Upon the vehicle operator applying the brakes, the brake application switch/sensor 82 provides an output signal along line 88 to the ECU 12. The tail lights indicated generally at 90 include the function of the tail lights as running tail lights denoted by reference numeral 92 and the function in which the LEDs are illuminated for rapid deceleration indicated by the block with reference numeral 94. Although the running LEDs and the deceleration LEDs 92, 94 are shown as separate function blocks in FIG. 2, it will be understood that they may be combined, as for example in each of the LED strips 28, 30, as shown in the version of FIG. 1.

Figure 3:
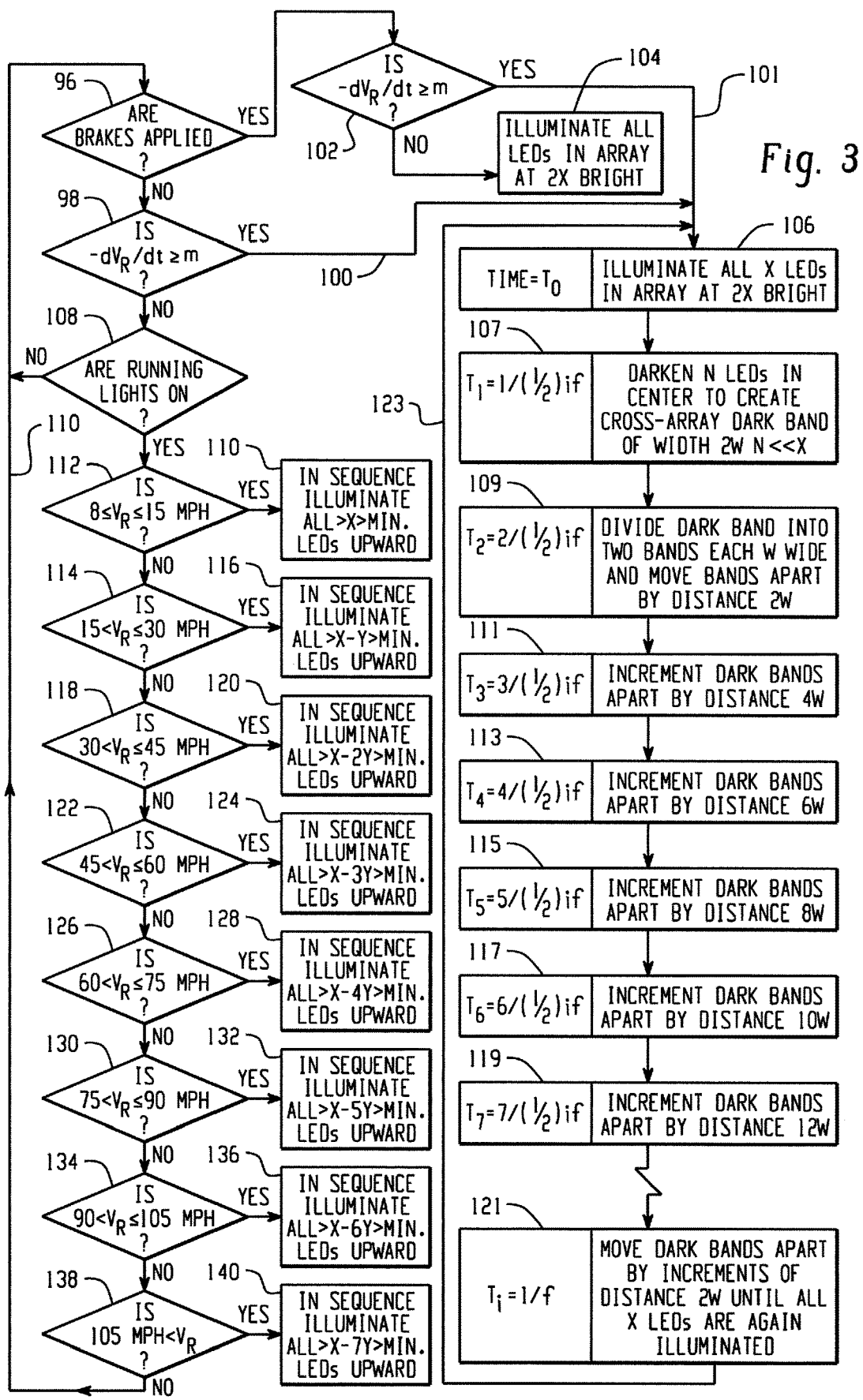
FIG. 3 is a flow diagram of the control process for the operation of the road speed responsive tail lights when the running lights are on and the incrementally advanced dark band tail light operation when the rate of deceleration exceeds a predetermined value.

Referring to FIG. 3, the process steps of operation of the electronic controller are indicated in a flow diagram, where the controller 12 determines at step 96 whether the brakes are applied; and, if not, proceeds to step 98 and determines whether the negative time rate of change of the vehicle road speed $V_R$ or deceleration, indicated as $-dV_R/dt$, is equal to or greater than a predetermined value "m"; and, if the answer is affirmative, e.g., "yes", the controller provides a signal along line 100 to step 106 and illuminates all the LED's in the array, at twice the illumination denoted "2X BRIGHT", than is normally provided for the tail lights when the running lights are "on".

If the determination at step 96 is affirmative, the ECU proceeds to inquire at step 102 whether the deceleration or negative time rate of change of road speed $-dV_R/dt$ is equal to or greater than a predetermined value "m" and, if the determination is negative, e.g., "no", the controller continues to illuminate all the LEDs in the array as indicated at step 104.

If the determination of step 102 is affirmative, the controller or ECU proceeds to step 106 to initiate the tail lights with a dark band incrementally moved and cycled as hereafter will be described. Returning to step 98, if the vehicle is not decelerating at a rate greater than "m", the controller or ECU proceeds to ask at step 108 whether the running lights are "on"; and, if the answer is negative, the ECU recycles to step 96 as indicated by line 110. If the answer at step 108 is affirmative, the system or ECU proceeds to step 112 and asks if the road speed $V_R$ is in the range of equal to or greater than 8 miles per hour and less than or equal to 15 miles per hour (mph); and, if the determination at step 112 is affirmative, the ECU proceeds to illuminate the number of LEDs as denoted by the character "X", which is a predetermined number less than all the LEDs and greater than a predetermined minimum; and, the ECU sequentially and accumulatively illuminates them in segments in order from the lowest segment vertically upward for decreasing speed to the highest of the segments and downward for increasing speed. If the determination at step 112 is negative, the ECU proceeds to step 114 and asks whether the road speed is in the range greater than 15 or equal to or less than 30 miles per hour. If the determination of step 114 is affirmative, the controller or ECU proceeds to in sequence illuminate a number of LEDs as determined by the total number "X" minus a predetermined number "Y" of LEDs such as, for example, the number of LEDs in a designated segment or row. In the present practice, it has been found satisfactory to have the ECU or controller reset and sample the road speed signal $V_R$ from sensor 64 at a rate in the range 24-30 Hertz for the steps in FIG. 3.

In one version of the system of the present disclosure, the LEDs may be arranged in a rectangular array as shown in FIGS. 4-11 in vertically spaced horizontally arranged segments or rows. In such an arrangement, the number designated as "Y" in step 116 will be three LEDs in horizontal row. However, where other configurations of an array for the LEDs are utilized, the number designated "Y" will be the number of LEDs in a designated segment of the array. For running light operations of steps 112-140, the vehicle must be changing road speed at a rate less than the predetermined rate "m" as employed in steps 98 and 102. Upon the vehicle road speed $V_R$ changing increasingly from one increment to another, the LED segments are sequentially illuminated upwardly and, upon the road speed $V_R$ changing from one increment of speed to the next lower increment of speed by deceleration, the ECU is operative to sequence the appropriate number of rows or segments downwardly.

If the determination at step 114 is negative, the ECU proceeds to step 118 and inquires whether the road speed $V_R$ is greater than 30 and equal to or less than 45 miles per hour. If the determination of step 118 is affirmative, the system proceeds to step 120 and illuminates, in sequence, a number of LEDs determined by "X" minus "2Y" which is less than all and greater than a minimum. The sequential illuminations in step 120 is upward.

If the determination of step 118 is negative, the system ECU proceeds to step 122 and inquires whether the road speed $V_R$ is in the range greater than 45 and equal to or less than 60 miles per hour. If the determination is step 122 is affirmative, the system proceeds to step 124 and illuminates in sequence the number of LEDs "X" minus "3Y", which is less than all but greater than the predetermined minimum of LEDs, and does so upwardly in sequence.

If the determination in step 122 is in the negative, the system ECU proceeds to step 126 and determines whether the road speed $V_R$ is in the range greater than 60 and equal to or less than 75 miles per hour; and, if the determination of step 126 is affirmative, the system ECU proceeds to at step 128 to sequentially illuminate the number of LEDS determined by "X" minus "4Y".

If the determination of step 126 is negative the system ECU proceeds to step 130 and determines whether the road speed $V_R$ is in the range greater than 75 and less than or equal to 90 miles per hour. If the determination of step 130 is affirmative, the system ECU proceeds to step 132 and it sequentially illuminates a number of LEDs determined by "X" minus "5Y" and does so sequentially upwardly. If the determination at step 130 is negative, the system proceeds to step 134 and asks whether the road speed $V_R$ is in the range greater than 90 mph and equal to or less than 105 miles per hour. If the determination at step 134 is affirmative, the system proceeds to step 136 and illuminates sequentially the number LEDs determined by "X" minus "6Y" and illuminates them sequentially upward.

If the determination of step 134 is negative, the system is recycled and returns to step 96 as indicated along line 110.

If the system determines at either of steps 98, 102 that the vehicle deceleration rate $-dV_R/dt$ is greater than a predetermined amount "m" for any reason including application of the vehicle brakes or other causes, the system proceeds to step 96 and the controller 12 is operable to cyclically illuminate the LEDs in the tail light array as described below.

Figure 4:
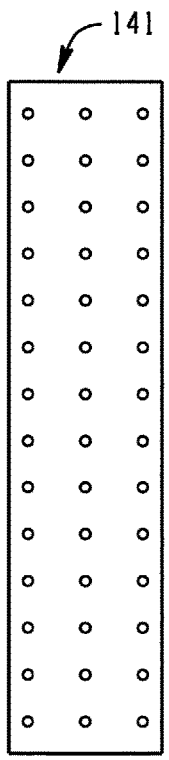
FIG. 4 is a view of one version of a rectangular LED array with all LEDs illuminated as occurs at $T_0$, the beginning and end of the dark band cycle.

Referring to FIG. 3, in the event of a signal along any of lines 100, 101, or 123, the ECU 12 illuminates all LEDs indicated at step 106 as "2X BRIGHT" at a time indicated as $T_0$. Referring to FIG. 4, a simplified exemplary rectangular array of the LEDs is illustrated as having only 14 vertically spaced horizontal rows of LEDs with three LEDs in each row for simplicity of illustration. It will be understood however, as in FIG. 1, the LED strips will, in practice, have a greater number of LEDs in each segment or row and that other arrangements of an LED array may be employed. The rows of LEDs illustrated in FIG. 4 is exemplary of a designed segment of the chosen LED array and may have an orientation other than a row such as, for example, a cluster of square, rectangular or normal configuration. With respect to the array illustrated in FIG. 4, all of the LEDs in any one of the rows or segments will be illuminated simultaneously as will hereinafter be described.

The operation at step 106 begins a cycle of incremental sequential de-energization or darkening of individual segments or rows of LEDs in the array over a cycle having a period equal to the inverse of the frequency f of the cycle rate of the ECU (1/f).

Figure 5:
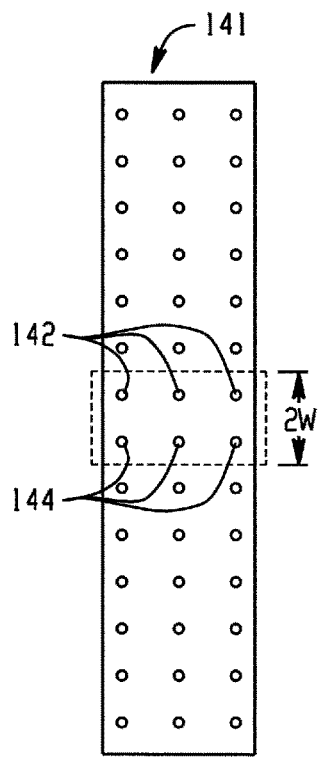
FIG. 5 is a view of the LED array of the assembly of FIG. 1 in which the initial central dark band is indicated in dashed outline at time $T_0$.

The ECU then proceeds to step 107 at time $$T_1 = \frac{1}{1/2if}$$

where "i" is the total number of rows or segments in the array. At step 107, the ECU is operative to darken the LEDs in a centrally located dark band of width 2W, which is shown in FIG. 5 for the illustrated rectangular array of FIG. 4.

Figure 6:
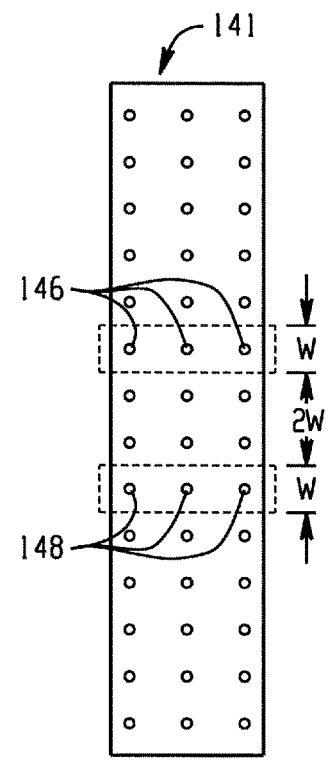
FIG. 6 is a view similar to FIG. 5 showing the first increment of movement of the dark band as divided and moved from the center position to the next adjacent row at time $T_2$.

The ECU then proceeds to step 109 at time $$T_2 = \frac{2}{1/2if}$$

whereupon the ECU is operative to move to the next adjacent segments or rows where the row of LEDs darkened are indicated by reference numerals 146, 148 in FIG. 6. When ECU 12 proceeds from step 107 to step 109, the ECU re-illuminates the LEDs 142, 144 and divides the dark band 2W into two dark bands each of width W, as indicated in FIG. 6 which are moved in opposite directions from the LEDs 142, 144 to an adjacent row or segment comprising the LEDs 146, 148.

Figure 7:
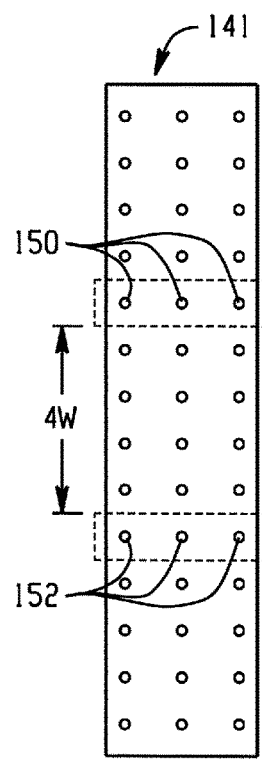
FIG. 7 is a view similar to FIG. 6 with the dark bands moved toward the margins to the next adjacent row from that illustrated in FIG. 6 at time $T_3$.

The ECU then moves to step 111 at time $$T_3 = \frac{3}{1/2if}$$

and re-illuminates the LEDs 140 in segments 146, 148 and darkens the LEDs in the segments indicated 150, 152 as illustrated in FIG. 7, which results in the darkened bands being spaced apart at a distance 4W.

Figure 8:
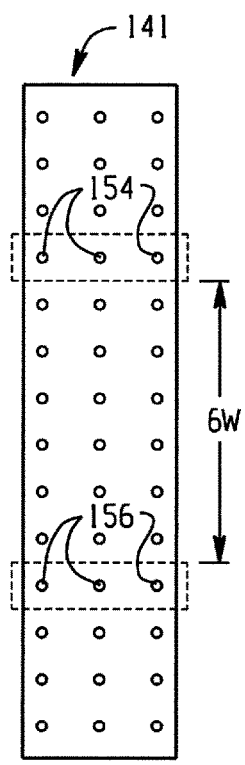
FIG. 8 is a view similar to FIG. 7 showing the dark bands moved toward the margins of the array to the next adjacent row to the position of FIG. 7 at time $T_4$.

The ECU then proceeds to step 113 at time $$T_4 = \frac{4}{1/2if}$$

whereupon the LEDs in segments or rows 150, 152 have been re-energized or re-illuminated; and, the ECU is operative to darken the LEDs in bands 154, 156 as illustrated in FIG. 8 and which are their separated by a distance 6W as denoted in FIG. 8.

Figure 9:
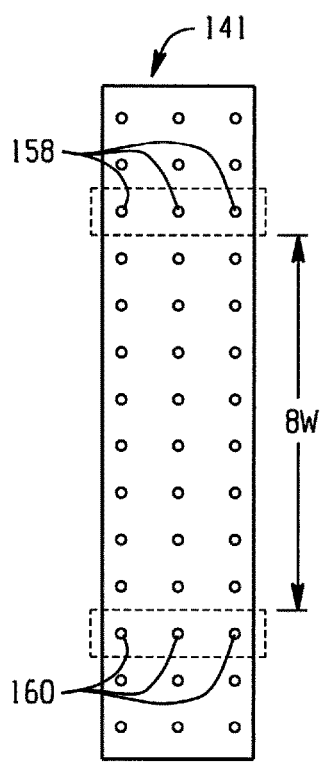
FIG. 9 is a view similar to FIG. 8 showing the dark bands moved toward the margins of the array to the next adjacent row from the position shown in FIG. 8 at time $T_5$.

The ECU then proceeds to step 115 at time $$T_5 = \frac{5}{1/2if}$$

whereupon the LEDs 154, 156 have been re-energized or illuminated; and, the dark bands have been moved to the next outwardly adjacent segment or rows of LEDs indicated at 158, 160 which are separated by the distance 8W as denoted in FIG. 9.

Figure 10:
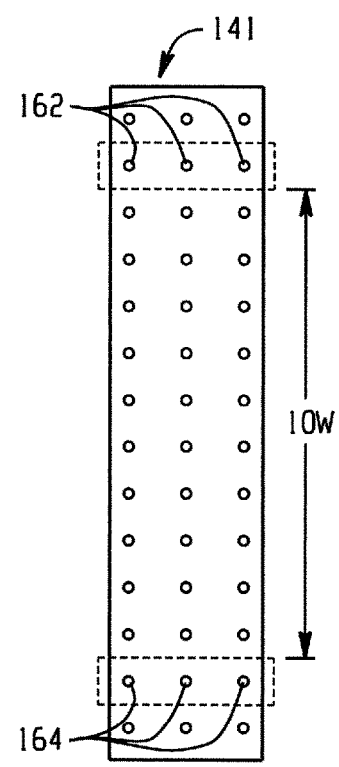
FIG. 10 is a view similar to FIG. 9 showing the dark bands moved towards the margins of the array to the next adjacent row to the position shown in FIG. 9 at time $T_6$.
Figure 11:
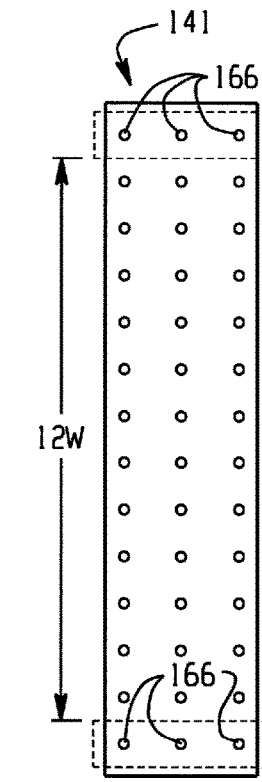
FIG. 11 is a view similar to FIG. 10 showing the dark bands moved to the row of LEDs adjacent the margin at time $T_7$.

The system proceeds to step 117 at time $$T_6 = \frac{6}{1/2if}$$

and re-illuminates the LEDs in segments 158, 160 and darkens the next adjacent bands in segments or rows 162, 164 as shown in FIG. 10 which are separated by distance 10W. The ECU 12 then proceeds to step 119 at time $$T_7 = \frac{7}{1/2if}$$

and re-illuminates the segments 162, 164 and darkens the last or marginal segments 166, 168 of the array 141 as shown in FIG. 11. The ECU then proceeds to re-energize or illuminate the last segments 166, 168 to illuminate all the LEDs in the array at time $T_i$ and to return to step 106 along line 119 as shown in FIG. 3, and with reference to FIG. 4.

In the present practice, it has been found satisfactory to provide a cycle at frequency "f" in the range of 0.5 Hz to 20 Hz for providing optimum visual perception and stimulation of human reaction. The increment of time Δt between sequentially darkening adjacent bands or segments of the LEDs is determined by $$\Delta t = \frac{1}{1/2if}$$

where "i" is the total number of segments of the array to be incrementally darkened where the central segments or rows are initially darkened, and the darkened bands move in opposite directions. Alternatively, if a discrete segment band at a margin of the array is initially darkened and only a single dark band is sequentially moved cyclically across the array, the increment of time between movement Δt will be determined by $$\Delta t = \frac{1}{if}.$$

The cyclic movement of the dark bands in the cycle of steps 106-117 of FIG. 3 and as illustrated for an exemplary array in FIGS. 4-11, thus gives the human operator of a trailing vehicle a flashing or rapidly moving series of dark bands in a tail light array which when performed in a cycle within the described frequency range.

Figure 12:
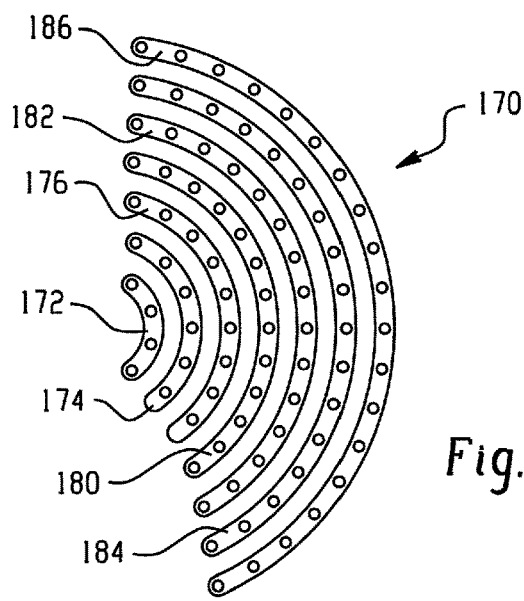
FIG. 12 is another version of an LED array having curved segments or rows spaced horizontally.

Referring to FIG. 12, another version of an array of LEDs for a tail light array is indicated generally at 170 and has a plurality of segments or rows disposed in an arcuate arrangement increasing in radius from left to right with each discrete segment or row indicated respectively by reference numerals 172-184 with the number of individual LEDs in each segment or arcuate row increasing as the radius is increased. The number of LEDs in any segment or row may be varied as desired for maximum effect of illumination. In the process of initially cycling centrally located dark bands in opposite directions, the ECU may begin with segment 180. Alternatively, darkening may begin with marginal band 172 and proceed rightward sequentially with a single darkened band.

Figure 13:
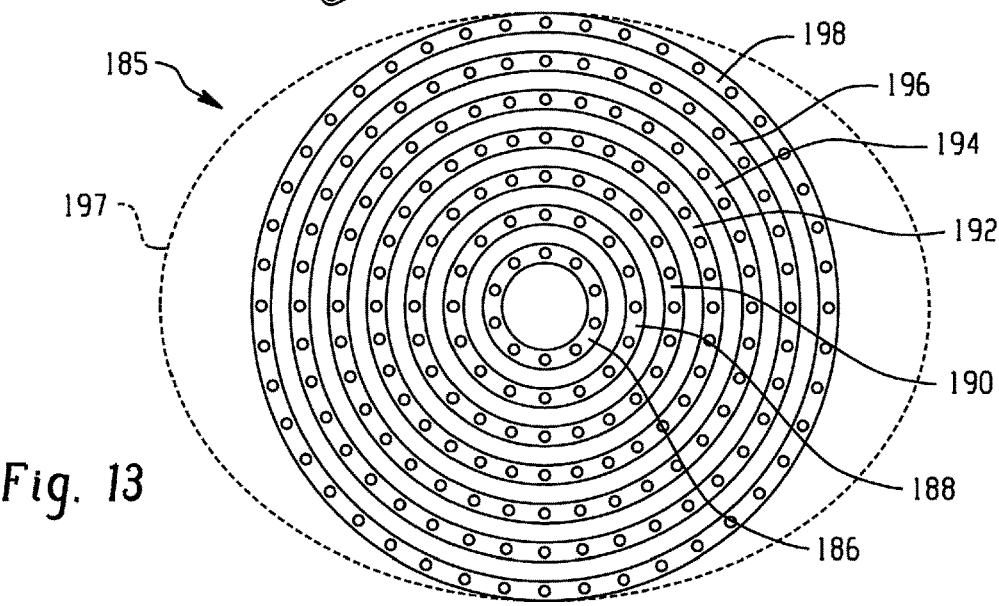
FIG. 13 is a view of another version of an LED array having the LEDs in segments as circular rows nested in radially spaced arrangement and shows an alternative shape of the array in dashed outline.

Referring to FIG. 13, another version of an LED array for tail lights is illustrated generally at 18 as having radially spaced circular segments or rows of LEDs radially spaced and nested such that the diameter of the circular arrangement increases proceeding outwardly from the innermost segment or ring as denoted by reference numerals 186-198 in FIG. 13. For cyclic movement of dark bands in response to rapid deceleration at a rate greater than "m", the central initial dark band may be chosen as row 194 for dual dark bands moving in opposite directions. Alternatively, inner row or segment 186 may be initially darkened and adjacent single rows sequentially darkened so as to move the darkened band cyclically outwardly of the array. An alternate arrangement of the array of FIG. 13 is illustrated by dashed outline 197 giving the array the appearance of an ellipse or oval arrangement of nested curved segments or rows as distinguished from the circular arrangement illustrated in solid outline.

Figure 14:
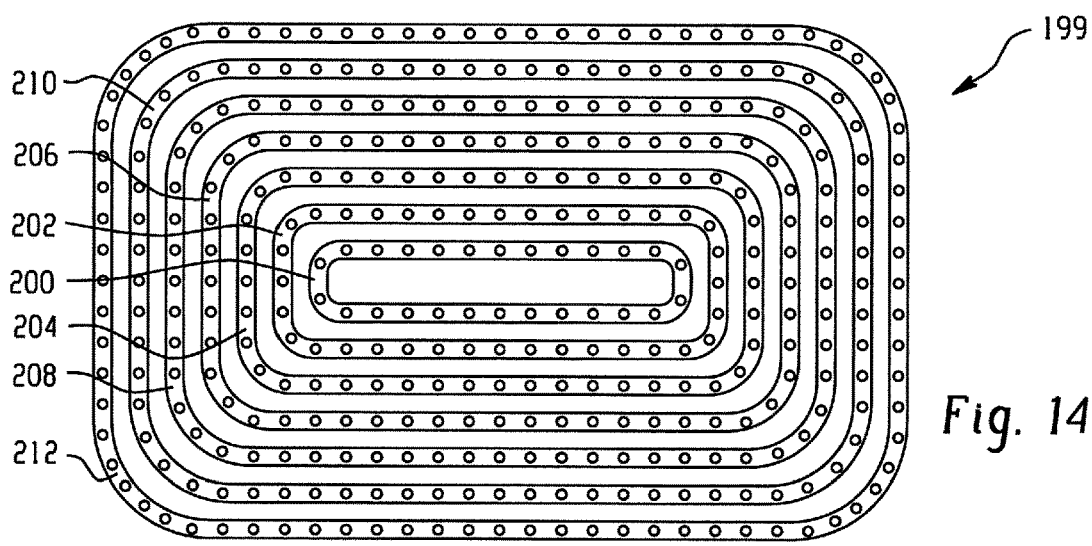
FIG. 14 is another version of an LED array showing an array having segments as rectangular rows nested in spaced arrangement.

Referring to FIG. 14, another version of an array of LEDs for a vehicle tail light is indicated generally at 199 as having a plurality of closed curved rectangular segments or rings of LEDs nested so as to have increased peripherally proceeding from the innermost to the outermost as indicated respectively by reference numerals 200-212 in FIG. 14. In the array 199 sequential cycling of a darkened single band for rates of deceleration greater than "m" may begin with row 200 and proceed sequentially outward or may begin centrally with row 204 and proceed with two darkened bands moving in opposite directions.

Figure 15:
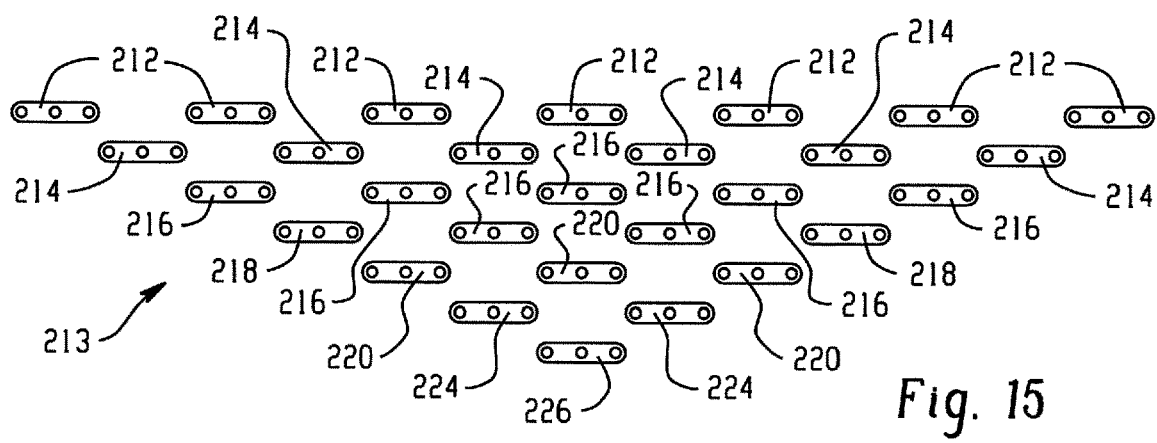
FIG. 15 is another version of an LED array in accordance with the present disclosure showing a V-shaped array of segments as rows of spaced LED clusters.

Referring to FIG. 15, another version of an array of LEDs for a vehicle tail light is indicated generally at 213 and is configured as a triangular-shaped array with the vertex or apex of the triangle at the lowest point of the array 213. The array 213 has a plurality of sub-segments arranged in horizontally spaced arrangement so as to comprise a segment having a row of generally equally spaced sub-segments as denoted by reference numerals 212-226 in FIG. 15. In the arrangement of FIG. 15, for recurring light operation, the ECU 12 would sequentially illuminate the segments in an upward sequence beginning with the sub-segment 226; and, for rapid deceleration at a rate greater than "m", incrementally cyclically add the next adjacent vertically spaced segment or row.

Figure 16:
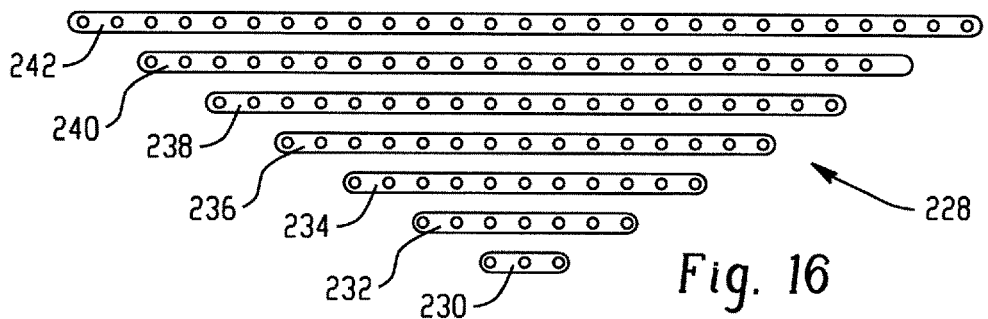
FIG. 16 is another version of an LED array in accordance with the present disclosure showing an array with segments of horizontally disposed rows of LEDs of progressively increasing in length from bottom to top; and, FIG. 17 is another version of an LED array in accordance with the present disclosure showing segments of linear rows of LEDs arranged nested to form a triangular shape with nested triangles closely spaced; and, an alternative triangular arrangement of the array is indicated in dashed outline.

Referring to FIG. 16, another version of an LED arrangement for a vehicle tail light is indicated generally at 228 and has a plurality of vertically spaced horizontal segments or rows of LEDs 230-242 forming a triangular array with the apex or vertex as the lowest point in the array. The ECU would illuminate the segment or row incrementally increasing sequentially from the lowest row or segment 230 upwardly until all segments 230-242 have been illuminated. For deceleration of rates greater than "m", the ECU would initially darken segment or row 230 and move a single darkened band sequentially to the next adjacent vertically spaced row.

Figure 17:
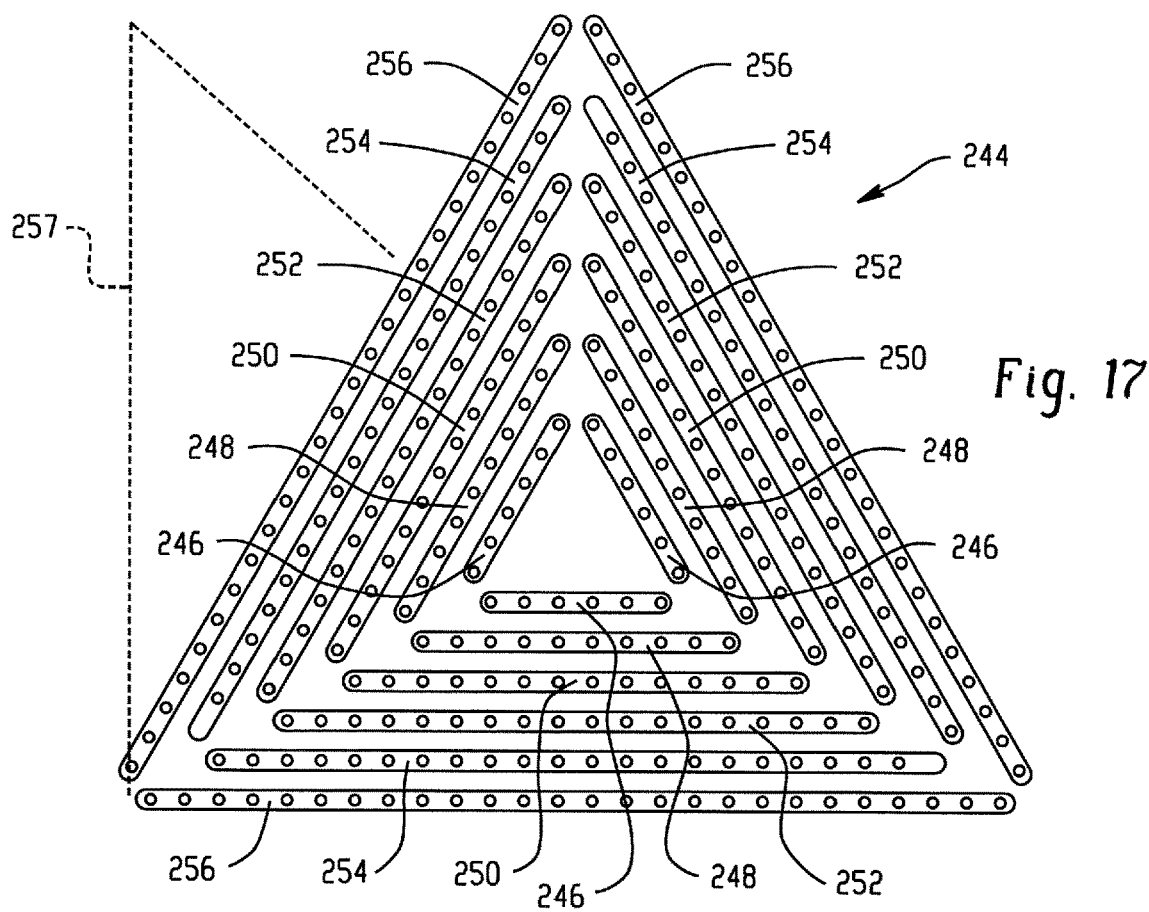

Referring to FIG. 17, another version of an array of LEDs for the tail lights of a vehicle is illustrated generally at 244 and has a trio of linearly disposed rows of LEDs arranged in a triangular disposition. A plurality of the triangles is disposed in nested arrangement with the vertex or apex oriented vertically upwards. The triangular arrangement is illustrated in FIG. 17 in solid outline whereupon the spaced triangular rows are denoted by reference numerals 234-244. The three row sub-segments of each triangular segment are simultaneously illuminated in the sequence. For deceleration at rates greater than "m", the ECU would initially darken triangle 246 for sequential single dark band movement outwardly to triangle 256. Alternatively, the array may be configured as shown by dashed line 257.

It will be understood that the sequential illumination of the segments in the versions of FIGS. 12-17 are accomplished in accordance with the steps 108-140 of FIG. 3 as running lights; and, according to steps 106-117 in response to rapid deceleration at a rate greater than "m".

The present disclosure thus describes a unique indicator for the benefit of a human operator of a trailing vehicle to provide indication to the human operator of the trailing vehicle of the road speed of the leading vehicle. The present disclosure also provides a rapidly changing appearance of an illuminated LED array by sequential movement of darkened bands in the array in response to rapid deceleration of the leading vehicle whether caused by operator application of the vehicle brakes or other causes.

The exemplary embodiment has been described with reference to the preferred embodiments. Obviously, modifications and alterations will occur to others upon reading and understanding the preceding detailed description. It is intended that the exemplary versions described herein be construed as including all such modifications and alterations insofar as they come within the scope of the appended claims or the equivalents thereof.

The invention claimed is:

1. A system for indicating vehicle speed using tail lights comprising:
   (a) an on-board power supply;
   (b) a vehicle road speed sensor operable to provide a road speed signal ($V_R$);
   (c) at least one array of discrete illuminators disposed on the vehicle as tail lights; and,
   (d) an electronic controller (ECU) connected for receiving power from the power supply, the road speed signal and operably connected to provide an illumination control signal to the at least one array, and the ECU is operable to calculate the negative time rate of change of increments of road speed $-dV_R/dt$ and upon determining that $-dV_R/dt$ exceeds a predetermined threshold to illuminate all illuminators in the array and then darken (de-energize) a discrete segment of the illuminated illuminators and then sequentially move the darkened segment to adjacent discrete segments of the illuminated illuminators at a predetermined cyclic rate in the range of 0.5-20 Hz to a remote margin of the array.

2. The system of claim 1, wherein the illuminators comprise light emitting diodes (LEDs).

3. The system of claim 2, wherein the LEDs comprise a minimum of 17 LEDs therein.

4. The system of claim 2, wherein the discrete segment of illuminators comprise rows of LEDs arranged horizontally and spaced vertically.

5. The system of claim 1, wherein the electronic controller is operable to sample the road speed signal in the range of 24-30 Hz.

6. The system of claim 1, wherein the discrete segments comprise spaced parallel rows of LEDs.

7. The system of claim 1, wherein the darkening sequentially is cycled at a predetermined rate from a discrete segment disposed centrally in the at least one array in opposite directions therefrom to margins of the array.

8. The system of claim 1, wherein the darkening sequentially is cycled from a discrete segment adjacent one margin of the array to a discrete segment adjacent a margin of the array opposite the one margin.

9. The system of claim 1, wherein the illuminators comprise LEDs and the electronic controller is operable to illuminate the LEDs at a brightness that is twice that employed when the vehicle running lights are on.

10. The system of claim 1, further comprising:
sequentially darkening adjacent segments of the discrete illuminators in response to the negative time rate of change of increments of road speed ($-dV_R/dt$) exceeding a predetermined value when the running lights are one of (i) on, and (ii) off.

11. A method of visibly signaling vehicle speed utilizing tail lights comprising:
(a) providing at least one tail light on the vehicle having an array of discrete illuminators;
(b) providing an on-board power supply;
(c) providing an onboard sensor connected to the power supply and operable to output an electrical signal ($V_R$) indicative of vehicle road speed; and
(d) providing an electronic control unit (ECU) and connecting the ECU to the power supply and connecting the ECU for receiving the sensor output $V_R$; and
(e) sensing changes in predetermined increments of road speed sensor output $V_R$ and when running lights are "on" illuminating all illuminators and then sequentially and cumulatively moving a darkened (de-energized) discrete segment cyclically at a rate in the range of 0.5-20 Hz across the array of illuminators to the margin thereof in response thereto.

12. The method of claim 11, wherein providing at least one tail light includes providing an array of discrete light emitting diodes (LEDs).

13. A method of visibly signaling vehicle deceleration a rate greater than a predetermining threshold utilizing vehicle tail lights comprising:
(a) providing an on-board power supply;
(b) providing at least one tail light having an array of discrete illuminators;
(c) providing a road speed sensor and connecting the sensor to the power supply and outputting an electrical signal indicative of vehicle road speed ($V_R$);
(d) providing an electronic controller and connecting the ECU to the power supply, sensor, and at least one tail light;
(e) determining the occurrence of a negative time rate of change of increments of $V_R$ ($-dV_R/dt$) with the ECU and outputting an illuminating signal to the at least one tail light array and illuminating all discrete illuminators in the array when $-dV_R/dt$ exceeds a predetermined threshold; and
(f) darkening (de-energizing) a band of the discrete illuminators and progressively moving the darkened band of the illuminators cyclically at a rate in the range of 0.5-20 Hz from an initial location on the array over the array to a margin thereof.

14. The method of claim 13 wherein the outputting of an illuminating signal occurs in response to one of (i) application of the vehicle brakes and (ii) without application of the vehicle brakes.

15. The method of claim 13, wherein providing at least one tail light includes providing an array of discrete light emitting diodes (LEDs).

* * * * *